United States Patent [19]

Rothgordt

[11] 4,054,885

[45] Oct. 18, 1977

[54] ELECTROSTATIC RECORDING DEVICE

[75] Inventor: Ulf Rothgordt, Hamburg, Germany

[73] Assignee: U.S. Philips Corporation, New York, N.Y.

[21] Appl. No.: 572,265

[22] Filed: Sept. 15, 1970

[30] Foreign Application Priority Data

Sept. 16, 1969 Germany ............................ 1946815

[51] Int. Cl.[2] ........................ G01D 15/06; G11B 9/08

[52] U.S. Cl. ................................................ 346/154

[58] Field of Search ............ 346/74 ES, 74 ESX, 153, 346/154

[56] References Cited

U.S. PATENT DOCUMENTS

| | | | |
|---|---|---|---|
| 2,955,894 | 10/1960 | Epstein | 346/74 ES |
| 3,112,693 | 12/1963 | Williams | 346/74 ES X |
| 3,131,256 | 4/1964 | Frohbach | 346/74 ES X |
| 3,196,451 | 7/1965 | Jones | 346/74 ES |
| 3,653,065 | 3/1972 | Brown | 346/154 |

*Primary Examiner*—Howard W. Britton

*Attorney, Agent, or Firm*—Frank R. Trifari; Robert S. Smith

[57] ABSTRACT

An electrostatic recording device in which an area on a record carrier is charged electrically. Electrodes are arranged on both sides of the carrier. The print electrodes arranged in groups on one side thereof serve to form the desirable charge image. The counter electrodes on the other side, serve to select the desirable print electrode group. The counter electrodes being arranged in spaced opposing relationship with portions of two groups of print electrodes. The print electrodes are arranged in even and odd groupings, with each alternating group set being electrically connected.

5 Claims, 1 Drawing Figure

ELECTROSTATIC RECORDING DEVICE

Figure 1:
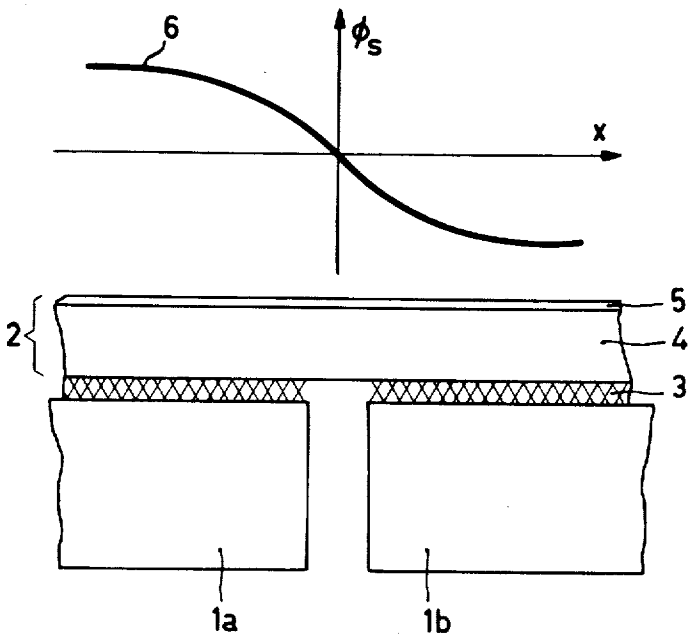

The invention relates to an electrostatic recording device in which an area on a record carrier is charged by electrically charged particles which orginate from a spontaneous gas discharge formed in the electric field between a print electrode and the record carrier, said discharge being produced when, by coinciding control of electrode arrangements acting on both sides of the record carrier, a threshold value of the electric field is exceeded, the print electrodes present on the side of the record carrier which comprises the charge image and serves to form the desirable charge image being combined in groups, and corresponding print electrodes of the various groups being switchable in common, counter electrodes on the rear side of the record carrier each time serving to select the desirable group of print electrodes.

Devices as described hereinbefore serve for the rapid recording of graphic information, for example, letters and digits in so-called high-speed printers or in rapid fascimile transmission methods. However, also curve plots or other graphic representations can be produced with suitable devices. Such devices incorporate generally three process steps in which during the first step a charge image corresponding to the desired information is produced on a special record carrier by suitable electrode arrangements. This invisible charge image is developed in the second step by suitable devices and means, that is to say it is made visible by means of dry powders or liquids suspensions. If required, the visible image is permanently connected, i.e. fixed, to the record carrier in a third step.

So the method of recording starts with a pictorial charge of the record carrier by means of "print electrodes". These print electrodes face the side of the record carrier which supports the charge image, while the rear side of the record carrier is to be contacted with so-called counter electrodes. An electric voltage the value of which depends upon the distance print electrode-counter electrode and upon the properties of the record carrier must be set up between the print electrodes and the counter electrodes to produce a charge image. The voltage must at least be so large that in the air gap between the print electrode and the surface of the record carrier a spontaneous gas discharge is ignited.

These print electrodes can be arranged in a variety of manners. Universally suitable for recording any graphic information are only devices the electrodes of which each time produce a small discharge point, as, for example, in a series of dot electrodes arranged beside one another or in matrix form. Since with the normal width of writing of printers and recording apparatus, several hundred to a thousand dots are necessary to reach a sufficient definition, it is of advantage to acuate the dots according to a coincidence principle. Several methods have already been proposed and carried out for this purpose. For example, print electrode arrangements are known in which each dot electrode is accompanied by an auxiliary electrode while a single counter electrode is operative for all the print electrodes in common. Only in the case of a simultaneous application of an electric voltage to the dot and the auxiliary electrodes is a spontaneous gas discharge introduced between the two, which results in a punctiform charge of the record carrier at the area of the controlled pair of electrodes. The drawback of such an arrangement is the gradual wear of the pair of electrodes and of the insulating material present between them by the constant formation of sparks. Other arrangements without subdivided counter electrodes comprise in front of each print electrode a pair of resistors which in a complete printing head is combined to form a matrix network and enables a coincidence control. The drawback in such an arrangement is the required large number of resistors, the complicated manufacture of the printing head and the comparatively high energy consumption in the resistance network. It has therefore been tried to realize a coincidence operation with simple print electrode arrangements and subdivided counter electrodes. For this purpose, arrangements of print electrodes in groups have been used in which a counter electrode, the value of which corresponded to the extension of the group, is arranged opposite to each group. When the groups of print electrodes are situated immediately beside each other, which is the case in substantially all the ranges of application, disturbances in the charge image occur in the edge regions of a group, which disturbances, in accordance with the conditions of recording, appear either as too weak a charge image or as a shadow image. The cause of this disturbance is the potential distribution in the substrate of the record carrier dependent upon the properties of the record carrier and determined by the potential at the counter electrodes. Actually, electrostatic record carriers basically have a structure which consists of at least two layers, namely first a substrate which has obtained a certain conductivity ($10^{-8} - 10^{-4}$ ($1\beta / \Omega$cm) by suitable measures, and on the substrate a thin dielectric layer on which the charge image is formed and maintained. The potential distribution in a substrate which is in contact with counter electrodes set up at a different potential is determined on the one hand by the conductivity distribution in the substrate which is more or less homogeneous. On the other hand it was found, however, that the contact resistance between counter electrodes and substrate has a much larger influence on said potential distribution, since in general it is very much larger, than the current-flow resistance originating from the substrate conductivity. Therefore, the potential distribution in the substrate at the boundary between two counter electrodes which are set up at different potentials does not show the desirable step-like variation but shows a gradual increase extending over several mms which begins already within the range of the one counter electrode and terminates only within the range of the other counter electrode. The result of this gradual and non-step-like potential variation, when using comparatively small voltages for the production of charge images, is an attentuation of the charge image at the edge, while in the case of higher voltages a sufficient quantity of charge is transmitted also in the edge region of the counter electrode, it is true, but instead of this characters of the preceding or following group occur in addition as shadow images.

In order to avoid these drawbacks, according to the invention, it is proposed in the arrangement described in the preamble that on the one hand the corresponding print electrodes of the odd groups and on the other hand the corresponding print electrodes of the even groups are connected electrically and, with the exception of the outermost counter electrodes, each counter electrode extends beneath two adjacent groups of print electrodes and each group of print electrodes co-operates with a pair of adjacent counter electrodes, switching means being present for switching simultaneously any pair of adjacent counter electrodes.

As a result of this arrangement it is ensured at any rate that, in the region of the desirable group of controlled print electrodes, the potential in the substrate has assumed the full value and, in the region of the other groups of controlled print electrodes, the potential in the substrate remains at the minimum value. Shadow print or too weak prints in the edge regions of the counter electrodes cannot occur.

Figure 2:
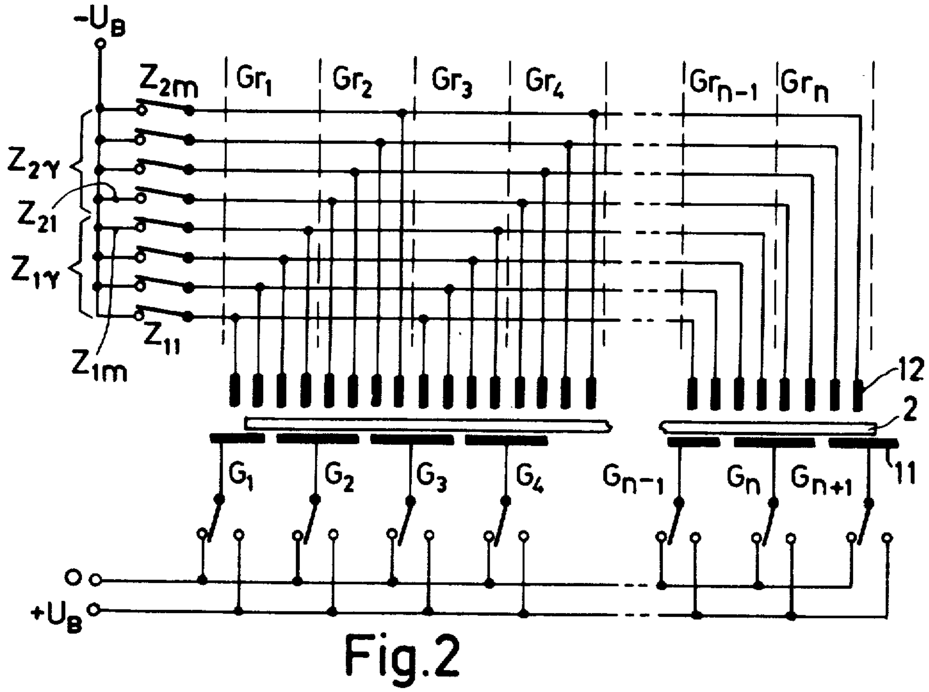

In order that the invention may be readily carried into effect, one embodiment thereof will now be described in greater detail, by way of example, with reference to the accompanying drawings, in which FIG. 1 shows the potential distribution in the substrate at the boundary of two counter electrodes with different potential, FIG. 2 shows an arrangement and circuit diagram of print and counter electrodes recording to the invention.

When an electrostatic record carrier, in particular a record carrier the substrate of which is a paper-like substance, is contacted with a counter electrode or basic electrode, a contact resistance which depends upon several parameters can be established in the contact zone. When the contact pressure is not too large, said resistance which is related to the surface unit is very much larger than the current-flow resistance of the substrate which is also related to the surface unit. Certainly, the cause of this is partly that the paperlike substance which is comparatively rough is in electric contact with the counter electrode only at a few points. The result of this contact resistance is a potential distribution $\phi_s$ in the substrate diagrammatically shown in FIG. 1, when the record carrier is present on two counter electrodes 1*a* and 1*b* of different potentials (for example, +U and −U, respectively. The record carrier 2 consists of the comparatively conductive substrate 4 and the layer 5 supporting the charge print. Between the substrate 4 and the counter electrodes 1 the contact resistance 3 is formed. The curve 6 represents the potential distribution dependent upon the place at the boundary between the substrate and the electric layer 5.

The typical potential variation shown in FIG. 1 loses its disturbing activity when an electrode arrangement as shown in FIG. 2 is used. The record carrier 2 can be moved at right angles to the plane of the drawing through the printing head-electrode arrangement consisting of the print electrodes 12 and the counter electrodes 11, so that a build-up of the charge print in rows or lines is possible. The print electrodes are combined to form groups $Gr_l$ to $Gr_n$ and are switched by switches Z $$_{\nu\mu}\begin{pmatrix}\nu = 1 \text{ or } 2 \\ \mu = 1 \ldots m\end{pmatrix}.$$

The corresponding print electrodes in the odd groups are electrically connected and lead to a series of character switches $Z_1/\mu$ ($Z_{11} \ldots Z_{1m}$), while in a corresponding manner the print electrodes in the even groups are connected to the character switches $Z_2\,\mu(Z_{21} \ldots Z_{2m})$. The counter electrodes 11 are individually connected to corresponding switches $G_1$ to $G_{n+1}$ which actually can be realized of course by suitable electronic circuits. The spatial arrangement of the counter electrodes has been chosen to be so that a group of print electrodes Gr λ is arranged opposite to the pair of electrodes 11 associated with the switches G λ and G $\lambda_{+1}$ and the edge region of the pair of counter electrodes not situated opposite to said group Gr λ have approximately the same value, where λ is an integer of the series 1 . . . *n*. When a recording in the range of the print electrode group Gr λ is desirable, the required character switches $Z_1\,\mu$ must be actuated for odd λ and the corresponding switches $Z_2\,\mu$ must be actuated for even λ as well as the switches G λ and $G\lambda_{+1}$ must be switched on.

For using this method in rapid line printers, a very simple pulse plan is available for the Gλ since advantageously the recording should be effected per series of groups. In the first step of a series, counter electrode switches $G_1$ and $G_2$ must hence be switched on; of the print electrodes 12 of group $Gr_1$, the desirable charge print points can be recorded by selecting certain switches of $Z_1\,\mu$ repesenting the information. In the second step follow counter electrode switches $G_2 + G_3$ as well as for group $Gr_2$ the desired switches $Z_2\,\mu$. In the third step follow counter electrode switches $G_3$ and $G_4$ for the group $Gr_3$, for this group, however, again certain switches $Z_1\,\mu$. The switch groups $Z_1\,\mu$ and $Z_2\,\mu$ consequently alternate, while the switches G λ are switched on and off serially and remain switched on for two steps.

The arrangement can also be used advantageously for any sequence of the print electrode groups, for example, for rapid recorders and plotters. It must only be ensured that in the case of a recording desirable in group Gr λ the two counter electrode switches G λ and G $\lambda_{+1}$ are switched on.

A further advantage of the idea underlying the invention can be recognized on the basis of the description when the arrangement is used in high-speed printers. Since actually the character switches $Z_1\,\mu$ and $Z_2\,\mu$ are used alternately, the waiting time between two steps is omitted which, when electronic components in the switches are used, is necessary as a recovery time for the switched-on character switches. This recovery time can be filled with the operating time of the other group of character switches when the decay of the character switches occurs in the form of overswing in the opposite direction, as, for example, in transformer-coupled switches.

As compared with a printing head arrangement with resistance network the arrangement proposed has the advantage that the group and character switches (G λ and Z ν μ) which can advantageously be manufactured from semiconductor components must be designed only for approximately half the voltage.

What is claimed is:

1. An electrographic recording system for recording on a record medium having a charge retentive surface, said system comprising:

a plurality of arrays of recording electrodes, with each recording electrode mounted with an area thereof in close proximity to said charge retentive surface;

circuit means interconnecting like-numbered recording electrodes of separated arrays to establish at least two electrically independent groups of arrays with each array of each group separated from every other array of said group by at least one array of another group;

a plurality of complementary electrodes mounted with an area of each in electrical cooperative relationship with said record medium, each complementary electrode being mounted adjacent to a single array of a group of arrays and spaced from all other arrays of said group by at least a portion of an array of another group;

means for applying a first voltage of one polarity to any selected recording electrode;

means for applying a second voltage of opposite polarity to at least one complementary electrode adjacent to the selected recording electrode, in coincidence with said first voltage and wherein the record medium is threaded between the recording electrodes and the complementary electrodes and is in intimate contact with the complementary electrodes.

2. A recording system as described in claim 1 wherein the second voltage is applied to all complementary electrodes which are closer to the array containing the selected recording electrode than they are to any other array in the group of arrays containing the selected electrode.

3. The apparatus as described in claim 1 wherein said means for applying a first voltage and said means for applying a second voltage includes semiconductor components.

4. An electrographic recording system for recording on a record medium having a charge retentive surface said system comprising:

a plurality of arrays of recording electrodes, with each recording electrode mounted with an area thereof in close proximity to said charge retentive surface;

circuit means interconnecting like-numbered recording electrodes of separated arrays to establish at least two electrically independent groups of arrays, with each array of each group separated from ever other array of said group by at least one array of another group;

a plurality of complementary electrodes mounted with an area of each in electrical cooperative relationship with said record medium, each complementary electrode being mounted adjacent to a single array of a group of arrays and spaced from all other arrays of said group by at least a portion of an array of another group;

means for applying a first voltage of one polarity to any selected recording electrode;

means for applying a second voltage of opposite polarity to at least one complementary electrode adjacent to the selected recording electrode, in coincidence with said first voltage and wherein the record medium has a conductive portion which is not held at ground potential, and the complementary electrodes are mounted in electrical contact with the conductive portion of the record medium.

5. A recording system as described in claim 4 wherein the second voltage is applied to all complementary electrodes which are closer to the array containing the selected recording electrode than they are to any other array in the group of arrays containing the selected electrode.

* * * * *